United States Patent [19]
Hirath et al.

[11] Patent Number: 6,029,846
[45] Date of Patent: Feb. 29, 2000

[54] THERMALLY INSULATED HOUSING

[75] Inventors: Jürgen Hirath, Heidenheim; Markus Schütte, Nürnberg, both of Germany

[73] Assignee: BSH Bosch und Siemens Hausgeraete GmbH, Munich, Germany

[21] Appl. No.: 09/174,039

[22] Filed: Oct. 16, 1998

[30] Foreign Application Priority Data

Oct. 16, 1997 [DE] Germany .......................... 197 45 861

[51] Int. Cl.[7] .............................. B65D 25/14; H05K 9/00
[52] U.S. Cl. .............................. 220/592.05; 220/592.09; 220/592.1; 220/592.01
[58] Field of Search ................. 220/592.01, 592.02, 220/592.05, 592.09, 592.1, 592.2, 592.25, 592.27

[56] References Cited

U.S. PATENT DOCUMENTS

| | | | |
|---|---|---|---|
| 2,238,022 | 4/1941 | Johnson | 220/592.05 |
| 2,639,593 | 5/1953 | Deutgen | 220/592.09 |
| 3,913,996 | 10/1975 | Benford | 220/592.05 |
| 4,998,970 | 3/1991 | Nelson | 220/592.1 |
| 5,450,977 | 9/1995 | Moe | 220/592.09 |

*Primary Examiner*—Joseph M. Moy
*Attorney, Agent, or Firm*—Herbert L. Lerner; Laurence A. Greenberg

[57] ABSTRACT

A thermally insulated housing has a substantially vacuum-tight outer shell and an at least substantially vacuum-tight inner enclosure that is spaced apart from the outer shell. The elements are connected to one another in a vacuum-tight fashion by a connection section that is at least approximately U-shaped in cross section and which is secured by its section limbs to the outer shell on the one hand and to the inner enclosure on the other by welding. A point of connection of the limbs of the U-shaped connection section to the outer shell or to the inner enclosure is thickened. The thickened area has at least essentially the thickness of material of the inner enclosure or of the outer shell.

12 Claims, 2 Drawing Sheets

THERMALLY INSULATED HOUSING

BACKGROUND OF THE INVENTION

Field of the Invention

The invention relates to a thermally insulated housing with a substantially vacuum tight outer shell and an at least substantially vacuum tight inner enclosure that is spaced apart therefrom. The elements are connected to one another in a vacuum tight fashion by a connection section that is at least approximately U-shaped in cross section. The connection section is secured by its section limbs to the outer shell on the one hand and to the inner enclosure on the other, and which encloses, t together with the outer shell and the inner enclosure, an evacuated intermediate space which is filled with a thermal insulation material.

Thermally insulated walls that are based on vacuum insulation technology are currently formed virtually without exception from two metallic sleeve walls which are disposed at a distance from one another and which are supported on one another by a supporting material which can be evacuated. The walls are welded along their contour to a connection section configured with a U-shaped cross section in order to enclose a space that can be evacuated. During the implementation of the welded connection it is necessary to ensure that the connection section, which has to be made as thin-walled as possible in order to avoid thermal conduction which considerably reduces the insulation capacity of the thermally insulating wall, does not have a tendency, as a result of the supply of heat during the welding process, to distort, which may under certain circumstances lead to leaks. Attempts are made to avoid this with a complicated clamping technology, which additionally involves the problem of accommodating the necessary clamping mechanism on the available restricted space. In order to avoid both the costly clamping mechanism and the distortions, a procedure has been adopted which provides that all sides of the connection section have a thickness of material that is in the order of magnitude of the sleeve shell. However, the result of this is that even more cost-intensive supporting materials, such as glass fibers, for example, have to be used to support the two sleeve walls so as to avoid a flow of heat which reduces the insulation effect of the thermally insulated wall. The supporting materials have the additional property of a high relative density leading to a high intrinsic weight.

SUMMARY OF THE INVENTION

It is accordingly an object of the invention to provide a thermally insulated housing that overcomes the above-mentioned disadvantages of the prior art devices of this general type, which is simple to construct.

With the foregoing and other objects in view there is provided, in accordance with the invention, a thermally insulated wall, including: a substantially vacuum tight outer shell having a given material thickness; an at least substantially vacuum tight inner enclosure having a given material thickness and disposed spaced apart from the outer shell; a thermal insulation material; a connection section having a substantially U-shaped cross section and two limbs including a first limb and a second limb each with a material thickness, the first limb connected to the inner enclosure in a vacuum tight manner and the second limb connected to the outer shell in a vacuum tight fashion, the connection section together with the outer shell and the inner enclosure enclosing an intermediate space filled with the thermal insulation material, the connection section also having an at least substantially vacuum-tight foil-shaped base connecting the two limbs to each other; and a thickening means having a material thickness disposed at each point of connection between each of the two limbs and one of the outer shell and the inner enclosure, the material thickness of the thickening means plus the material thickness of one of the two limbs substantially equal to the given material thickness of one of the inner enclosure and the outer shell.

The object is achieved according to the invention by virtue of the fact that the U-shaped connection section has a base which connects its two limbs and is formed from an at least approximately vacuum tight foil. At the point of connection of the limbs to the outer shell and to the inner enclosure, there is thickened region having at least essentially the thickness of material of the inner enclosure or of the outer shell.

The solution according to the invention ensures that the connected elements, namely the limbs of the U-shaped connection section on the one hand and the outer shell or the inner enclosure on the other, exhibit an essentially identical melting behavior at the connection point. As a result of which, distortions of the connection section at the connection point and resulting potential leaks are reliably avoided even in mass production, and the processing reliability is thus considerably increased. Furthermore, despite the optimum connection conditions that are provided between the U-shaped connection section and the shells of the walls, a minimum degree of thermal conduction is obtained via the base of the U-shaped connection section. By virtue of the adaptation of the thickness of material at the connection point of the U-shaped connection section to the thickness of material of the inner enclosure or of the outer shell, the welding speed at the point where the two connected elements are connected, and thus the processing speed, can be considerably increased. In addition, the structural configuration of the connection point between the connected elements permits a certain degree of flexibility in the selection of the welding method that is applied. The solution according to the invention provides the possibility of effectively employing beam welding methods which permits high working speeds. The adaptation of the thickness of the limbs at the connection point to the thickness of the material of the inner enclosure or of the outer shell additionally permits, in conjunction with the various beam welding methods, significantly more convenient clamping of the two connected elements to one another so that the clamping technology which is applied can be significantly simplified in the form of clamping tools while maintaining the leak-free welding.

According to one preferred embodiment of the subject-matter of the invention there is provision that the means for producing the thickening of each limb of the U-shaped connection section are formed by in each case at least one panel element which, together with the inner enclosure or the outer shell, forms a receptacle in which the respective limb of the U-shaped connection section is disposed as an intermediate layer.

This provides the possibility of being able to fabricate the U-shaped connection section from a continuous foil-like material. Materials such as stainless steel or corrosion-protected steel, for example, which can then be clamped at the elements which serve as the limbs to the inner enclosure or the outer shell by the panel element, are appropriate. As a result, not only is a joining aid made available but also the thickness of the material of the elements which are to be connected by welding is increased. This enables the welding process not only to be sped up but also to be carried out in a vacuum-tight fashion during mass production.

According to one alternative embodiment of the invention there is the provision that the means for producing the thickening at the connection point are produced by repeatedly folding the respective limb of the connection section which is fabricated from a foil-shaped material such as stainless steel, corrosion-protected steel and the like.

Such an embodiment of the connection section significantly facilitates the process of joining the elements to be connected, since there is no need to hold and position additional elements.

According to one further alternative embodiment of the invention there is the provision that the means for producing the thickening at the connection point are formed by the limb elements which have essentially the thickness of material of the outer shell or of the inner enclosure and which are joined to a foil-shaped base which connects them, and form, together with the base, the U-shaped connection section.

This provides the possibility of combining the limb elements, which, according to requirements, are provided with a different thickness of material, with a foil-shaped, thin-walled base in order to be able to optimize the process of welding the connection section to the outer shell and/or to the inner enclosure in a cost-effective fashion. The vacuum-tight connection of the limb elements, fabricated for example from stainless steel or corrosion-protected steel, to the foil-shaped base is carried out cost-effectively by a separate welding process.

A particularly simple monitoring of the quality of the welded connection is obtained if, according to a further advantageous embodiment of the invention, there is the provision that the means for producing the thickening has a thickness of material which permits a visible weld root on the inner enclosure or the outer shell.

According to an alternative embodiment of the invention there is the provision that the means for producing the thickening has a thickness of material which prevents a visible weld root on the inner enclosure or the outer shell.

Such an embodiment makes it possible to dispense with protective measures such as the provision of protective gas during the welding process in order to prevent oxidization of the weld roots. Furthermore, pores and fractures on the weld root that may under certain circumstances lead to a lack of tightness of the evacuated intermediate space between the outer shell and the inner enclosure are avoided. Furthermore, the elements to be connected, in particular the outer shell and the inner enclosure, have smooth visible surfaces which permit the functional elements, such as for example clip connections or the like, to be attached in a defined position significantly more easily.

According to a further preferred embodiment of the invention there is the provision that the weld connection between the limbs of the connection section on the one hand and the outer shell and the inner enclosure on the other is provided in an area near to the base of the U-shaped connection section.

Positioning the weld seam in such a way makes it possible to keep the vacuum-side length of the overlap of the two connected elements fairly small, minimizing possible gas occlusions between the connected elements so that a rise in pressure in the evacuated intermediate space resulting from the gas occlusions is very largely avoided.

According to a further preferred embodiment of the subject-matter of the invention there is the provision that the weld connection between the limbs of the connection section on the one hand and the outer shell and the inner enclosure on the other is produced by a beam welding method or by seam welding.

In the case of the application of a beam welding method such as a laser beam or electron beam welding method, for example, a high manufacturing speed for the thermally insulating walls is achieved as a result of a high welding speed. On the other hand, the application of a seam weld provides a structure that is convenient in terms of industrial engineering.

The thermally insulated wall can be fabricated in a particularly reliable way for processing in the case of a refrigerator with a thermally insulated housing and a thermally insulated door attached thereto if, according to a further preferred embodiment of the invention, there is provision that the thermally insulated housing and the thermally insulated door are constructed according to the above disclosed invention.

The thermally insulated wall can be fabricated in a likewise particularly reliable way for processing in the case of a domestic oven with an oven muffle of a thermally insulated construction if, according to a final preferred embodiment of the invention, there is provision that the oven muffle is constructed according to the above disclosed invention.

Other features which are considered as characteristic for the invention are set forth in the appended claims.

Although the invention is illustrated and described herein as embodied in a thermally insulated housing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
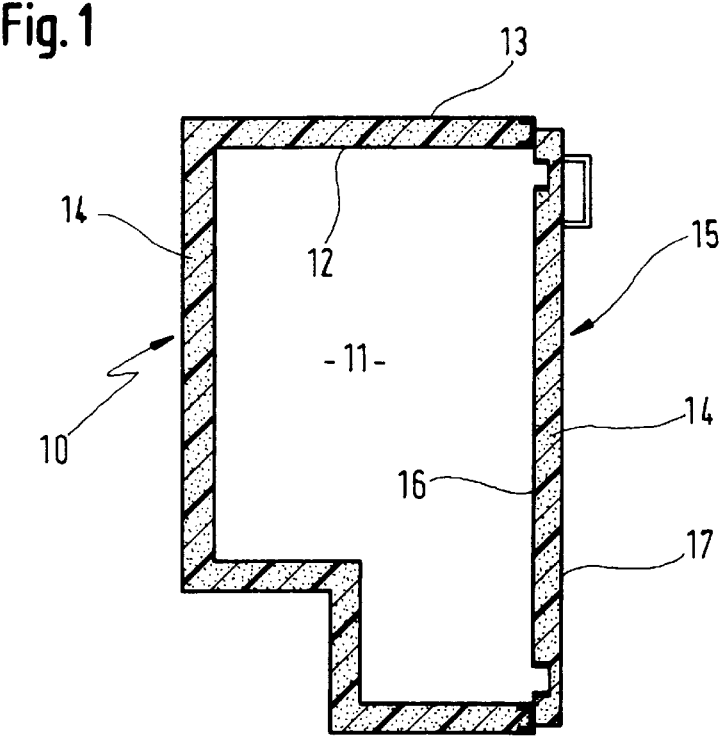
FIG. 1 is a simplified, diagrammatic sectional view of a thermally insulated housing for a domestic refrigerator with an outer shell and an inner enclosure which is spaced apart therefrom, the elements are connected to one another in a vacuum tight fashion by a U-shaped connection section according to the invention.

In all the figures of the drawing, sub-features and integral parts that correspond to one another bear the same reference symbol in each case. Referring now to the figures of the drawing in detail and first, particularly, to FIG. 1 thereof, there is shown a thermally insulated housing 10 that is suitable for use in a domestic refrigerator or freezer. Within the housing 10 is a useful space or compartment 11 which is configured as a refrigeration space. The space 11 is lined by a vacuum tight inner enclosure 12 which is formed, for example from a 0.4 mm-thick stainless steel plate or corrosion-protected steel plate. A vacuum tight outer shell 13, which is formed from the same material, is disposed at a distance from the inner enclosure 12. Between the outer shell 13 and the inner enclosure 12 there is a thermal insulation material 14, such as open-celled polyurethane foam or open-celled polystyrene foam, for example, which can be evacuated and which serves to support the inner enclosure 12. Such a thermal insulation material 14 also serves as a thermally insulating filling for a door 15 that is attached to the housing 10. The door 15, like the housing 10, has on its inside a vacuum tight inner enclosure 16 and a vacuum tight outer shell 17 which is spaced apart therefrom. The inner enclosure 16 and the outer shell 17 are formed from the same material as the inner enclosure 12 and the outer shell 13. Both the inner enclosure 16 and the outer shell 17 and the inner enclosure 12 and the outer shell 13 are connected to one another in a vacuum tight fashion at their free edges, forming between them an intermediate space which can be evacuated and which is filled with the thermal insulation material 14 in order to support the inner enclosures 12, 16 and the outer shells 13, 17.

Figure 2:
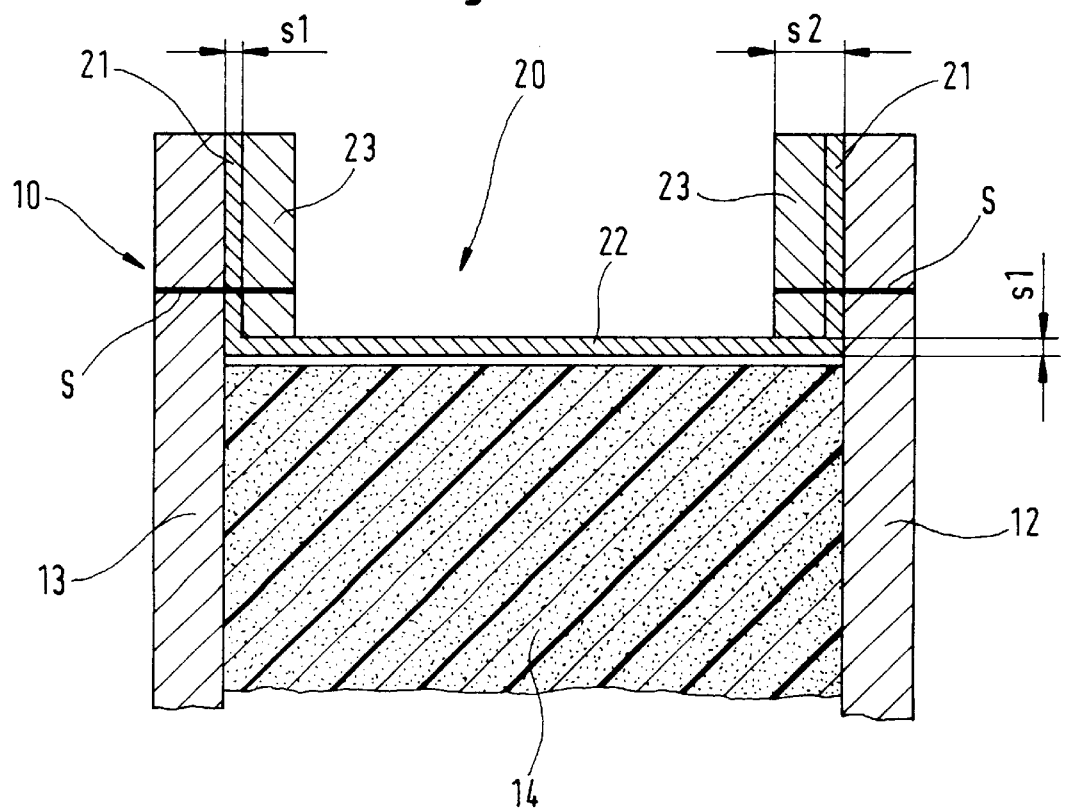
FIG. 2 is a fragmentary, sectional view of the housing in a region of its connection to the connection section in accordance with a first embodiment variant with the aim of increasing a thickness of a material at a connection point.

As is clear in particular from FIG. 2, a connection section 20 serves to produce the vacuum tight connection between the inner enclosure 12 and the outer shell 13, and the inner enclosure 16 and the outer shell 17 respectively. The connection section 20 is U-shaped in cross section, being provided, in accordance with a first embodiment variant, with a foil-like thickness of material both at its limbs 21 and its base 22 which connects the limbs 21. The connection section 20 is formed, for example, from a stainless steel foil or corrosion-protected steel foil with a material thickness s1 of approximately 0.1 mm. The connection section 20 that is described below with reference to the example of the housing 10 is adapted, in terms of the width of its base 22, to the clear width between the inner enclosure 12 and the outer shell 13 and the base 22 extends up to the thermal insulation material 14. The vacuum tight connection between the inner enclosure 12 and the outer shell 13, and the connection section 20 is produced by a welded connection that is disposed in the area near to the base 22 and along the limbs 21. In order, when implementing the weld connection, to prevent the foil-like limbs 21 from becoming distorted under the influence of the heat of the welding process, panel elements 23 are provided which run along the limbs 21. The panel elements 23 that produce, together with the foil-like limbs 21, at least approximately the material thickness s2 of the inner enclosures 12 and of the outer shells 13, respectively. The panel elements 23 together with the limbs 21 are pressed against the inside of the inner enclosure 12 or the outer shell 13 by non-illustrated clamping devices so that the foil-like limbs bear flat against the inside of the inner enclosure 12 or the outer shell 13. Furthermore, the panel elements 23 serve to enlarge the thickness of the material of the limbs 21 at their point of connection to the inner enclosure 12 or the outer shell 13 in order to obtain an approximately equal fusion behavior of the two elements to be connected during the welding process. Here, a weld seam S that is produced during the welding process completely penetrates not only the inner enclosure 12 and the outer shell 13 but also the limbs 21 and the panel elements 23.

Figure 3:
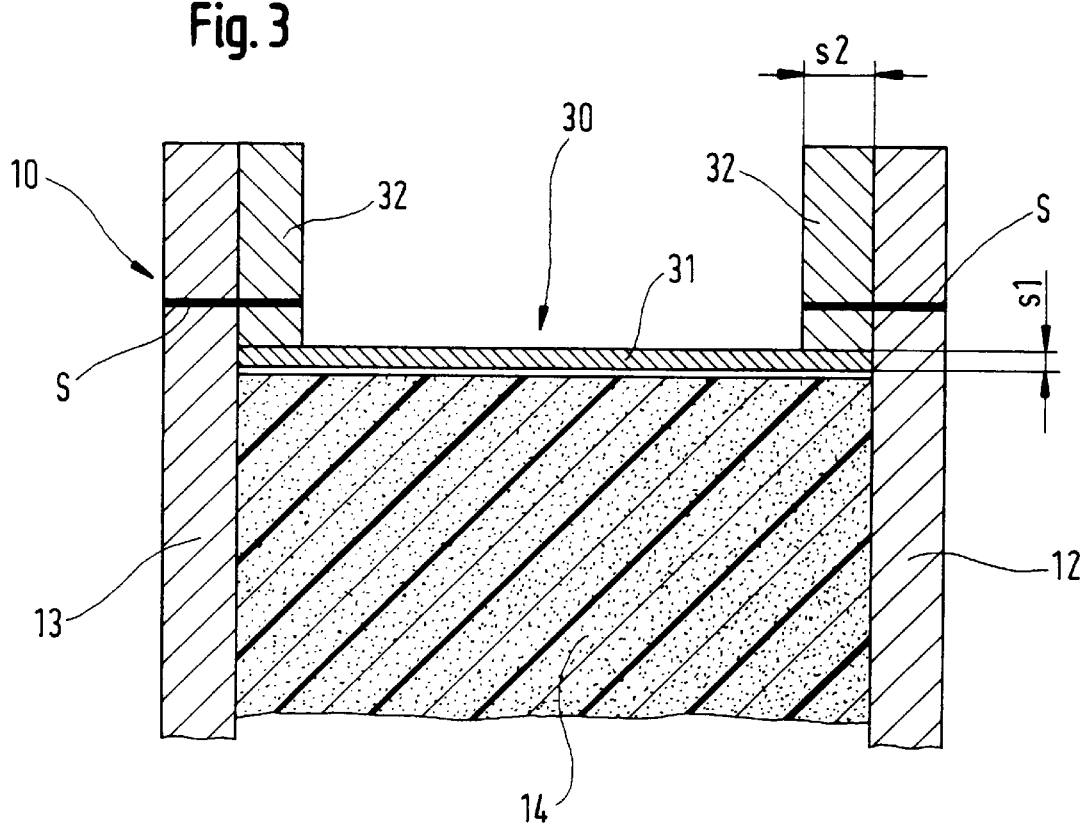
FIG. 3 is a fragmentary, sectional view of a portion of the housing in the region of its connection to the connection section in accordance with a further embodiment variant with the aim of increasing the thickness of the material at the connection point.

In accordance with FIG. 3, a further embodiment of a connection section 30 which is U-shaped in cross section is provided for connecting the inner enclosure 12 to the outer shell 13. A base 31 of the connection section 30 is of foil-like construction as is the base 22 of the connection section 20. Limbs 32 of the connection section 30 are joined to the base 31 by welding and are provided with a material thickness s2 which corresponds essentially to the thickness of the material of the inner enclosure 12 and the outer shell 13.

The very large degree of adaptation of the limbs 32 in their material thickness s2 to the material thickness of the inner enclosure 12 and of the outer shell 13 is achieved by virtue of the fact that a uniform fusion process can be carried out between the elements to be connected using the welding process, namely the connection of the connection section 30 to the inner enclosure 12 and to the outer shell 13, respectively. Here, the weld seam S is obtained which completely penetrates the connected elements and which has a quality which ensures a uniform, permanently vacuum tight connection of the connected elements along the limbs 32.

Figure 4:
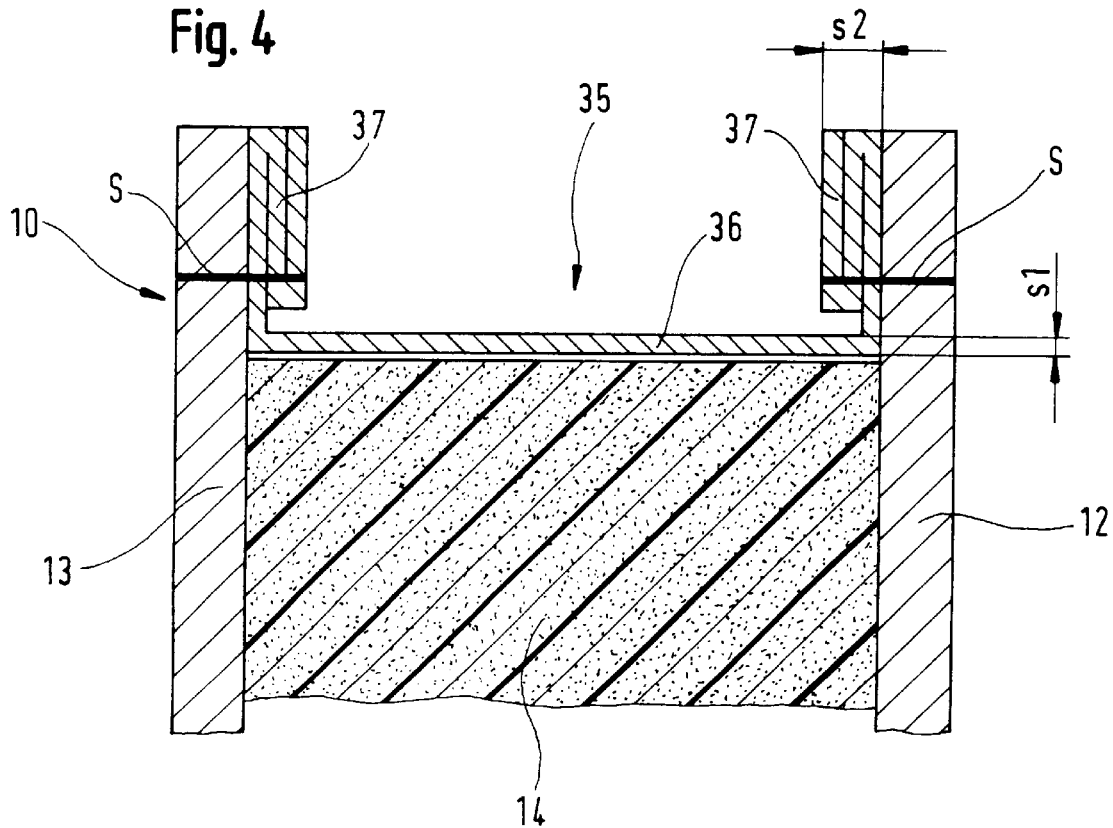
FIG. 4 is a fragmentary, sectional view of a portion of the housing in the region of its connection to the connection section in accordance with a third embodiment variant with the aim of increasing the thickness of the material at the connection point.

A third embodiment variant of the vacuum tight connection of the inner enclosure 12 to the outer shell 13 is shown in FIG. 4. Like the connection sections 20 and 30, a connection section 35 is provided with a foil-like base 36 which is adjoined in one piece by two limbs 37 which have essentially the thickness of the material of the inner enclosure 12 or of the outer shell 13. The limbs 37 are produced in terms of the thickness of their material by repeatedly layering without gaps, for example, by repeatedly folding, the side edges of a sheet-metal blank (for example stainless steel or corrosion-protected steel) provided with foil-like material thickness. The part of the stainless steel sheet-metal blank that is not processed by folding forms the base 36. The layering of the foil-like material gives the limbs 37 a material thickness s2 that corresponds essentially to the thickness of the material of the inner enclosure 12 or of the outer shell 13. As a result of the increase in the thickness of the material at the limbs 37, an approximately identical fusion process occurs when welding energy is fed in between the limbs 37 and the inner enclosure 12 or the outer shell 13. The limbs 37 are simultaneously largely prevented from becoming distorted during the welding of the two connected elements by the weld seam S as a result of the increase in the thickness of the material.

The aforementioned structures of the connection sections 20, 30 and 35 can of course also be used to connect the inner enclosure 16 and the outer shell 17 to the door 15. In this case, the inner enclosure 16 and the outer shell 17 have to be shaped appropriately for the attachment of the connection section.

In contrast with the shown method of attaching the connection section, it is also possible to connect the latter to the inner enclosure or the outer shell in such a way that the limbs of the connection section engage over the two top layers of the housing at their free edges.

The configuration of the thermally insulated housing that is represented by way of example by the housing of a domestic refrigerator is also suitable for an oven (cooker) muffle which encloses the baking space of a domestic oven, in which case the thermal insulation materials which can be evacuated and which are used here as a support for the inner enclosure and the outer shell have to be configured in accordance with the temperature requirements which occur in domestic ovens.

We claim:

1. A thermally insulated wall, comprising:

a substantially vacuum tight outer shell having a given material thickness;

an at least substantially vacuum tight inner enclosure having a given material thickness and disposed spaced apart from said outer shell;

a thermal insulation material;

a connection section having a substantially U-shaped cross section and two limbs including a first limb and a second limb each with a material thickness, said first limb connected to said inner enclosure in a vacuum tight manner and said second limb connected to said outer shell in a vacuum tight fashion, said connection section together with said outer shell and said inner enclosure enclosing an intermediate space filled with said thermal insulation material, said connection section also having an at least substantially vacuum-tight foil-shaped base connecting said two limbs to each other; and a thickening means having a material thickness disposed at each point of connection between each of said two limbs and one of said outer shell and said inner enclosure, said material thickness of said thickening means plus said material thickness of one of said two limbs substantially equal to said given material thickness of one of said inner enclosure and said outer shell.

2. The thermally insulated wall according to claim 1, wherein said thickening means is formed of at least one panel element, said at least one panel element together with one of said inner enclosure and said outer shell forming a receptacle for receiving a respective one of said two limbs wherein said respective one of said two limbs is disposed as an intermediate layer.

3. The thermally insulated wall according to claim 1, wherein said thickening means for producing a thickening at the point of connection is produced by repeatedly folding a respective limb of said connection section.

4. The thermally insulated wall according to claim 1, wherein said thickening means for producing a thickening at the point of connection are formed of limb elements having a material thickness substantially equal to said given material thickness of one of said outer shell and said inner enclosure, said limb elements forming said two limbs and are joined to said foil-shaped base for forming together with said foil-shaped base said connection section having said U-shaped cross section.

5. The thermally insulated wall according to claim 1, wherein said material thickness of said thickening means is set at a value permitting a visible weld root to be formed on said inner enclosure and said outer shell during a welding process.

6. The thermally insulated wall according to claim 1, wherein said material thickness of said thickening means is set at a value preventing a visible weld root from forming on said inner enclosure and said outer shell during a welding process.

7. The thermally insulated wall according to claim 1, including weld connections formed between said first limb and said inner enclosure and between said second limb and said outer shell, said weld connections disposed in an area near to said foil-shaped base of said connection section.

8. The thermally insulated wall according to claim 1, including weld connections formed between said first limb and said inner enclosure and between said second limb and said outer shell, and said weld connections produced by a beam welding method.

9. The thermally insulated wall according to claim 1, including weld connections formed between said first limb and said inner enclosure and between said second limb and said inner enclosure, and said weld connections produced by seam welding.

10. A refrigerator, comprising:

a thermally insulated housing;

a thermally insulated door attached to said insulated housing;

said thermally insulated housing and said thermally insulated door each including:

a substantially vacuum tight outer shell having a given material thickness;

an at least substantially vacuum tight inner enclosure having a given material thickness and disposed spaced apart from said outer shell;

a thermal insulation material;

a connection section having a substantially U-shaped cross section and two limbs including a first limb and a second limb each with a material thickness, said first limb connected to said inner enclosure in a vacuum tight manner and said second limb connected to said outer shell in a vacuum tight fashion, said connection section together with said outer shell and said inner enclosure enclosing an intermediate space filled with said thermal insulation material, said connection section also having an at least substantially vacuum-tight foil-shaped base connecting said two limbs to each other; and a thickening means having a material thickness disposed at each point of connection between each of said two limbs and one of said outer shell and said inner enclosure, said material thickness of said thickening means plus said material thickness of one of said two limbs substantially equal to said given material thickness of one of said inner enclosure and said outer shell.

11. An oven muffle for domestic oven, comprising:

a substantially vacuum tight outer shell having a given material thickness;

an at least substantially vacuum tight inner enclosure having a given material thickness and disposed spaced apart from said outer shell;

a thermal insulation material;

a connection section having a substantially U-shaped cross section and two limbs including a first limb and a second limb each with a material thickness, said first limb connected to said inner enclosure in a vacuum tight manner and said second limb connected to said outer shell in a vacuum tight fashion, said connection section together with said outer shell and said inner enclosure enclosing an intermediate space filled with said thermal insulation material, said connection section also having an at least substantially vacuum-tight foil-shaped base connecting said two limbs to each other; and a thickening means having a material thickness disposed at each point of connection between each of said two limbs and one of said outer shell and said inner enclosure, said material thickness of said thickening means plus said material thickness of one of said two limbs substantially equal to said given material thickness of one of said inner enclosure and said outer shell.

12. A thermally insulated wall, comprising:

a substantially vacuum tight outer shell having a given material thickness;

an at least substantially vacuum tight inner enclosure having a given material thickness and disposed spaced apart from said outer shell;

a thermal insulation material;

a connection section having a substantially U-shaped cross section and two limbs including a first limb and a second limb each with a material thickness, said first limb connected to said inner enclosure in a vacuum tight manner and said second limb connected to said outer shell in a vacuum tight fashion, said connection section together with said outer shell and said inner enclosure enclosing an intermediate space filled with said thermal insulation material, said connection section also having an at least substantially vacuum-tight foil-shaped base connecting said two limbs to each other; and a thickening device having a material thickness disposed at each point of connection between each of said two limbs and one of said outer shell and said inner enclosure, said material thickness of said thickening device plus said material thickness of one of said two limbs substantially equal to said given material thickness of one of said inner enclosure and said outer shell.

\* \* \* \* \*